(12) United States Patent
Korkishko et al.

(10) Patent No.: US 9,432,195 B2
(45) Date of Patent: Aug. 30, 2016

(54) METHOD OF OPERATING DATA SECURITY AND ELECTRONIC DEVICE SUPPORTING THE SAME

(71) Applicant: Samsung Electronics Co., Ltd., Gyeonggi-do (KR)

(72) Inventors: Tymur Korkishko, Gyeonggi-do (KR); Kyunghee Lee, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 21 days.

(21) Appl. No.: 14/455,268

(22) Filed: Aug. 8, 2014

(65) Prior Publication Data

US 2015/0046712 A1 Feb. 12, 2015

(30) Foreign Application Priority Data

Aug. 8, 2013 (KR) ................. 10-2013-0093950

(51) Int. Cl.
*H04L 29/06* (2006.01)
*H04L 9/32* (2006.01)
*H04L 9/08* (2006.01)
*G06F 21/53* (2013.01)
*G06F 21/60* (2013.01)

(52) U.S. Cl.
CPC ............. *H04L 9/3234* (2013.01); *G06F 21/53* (2013.01); *G06F 21/606* (2013.01); *H04L 9/0869* (2013.01); *H04L 63/067* (2013.01); *H04L 63/0876* (2013.01)

(58) Field of Classification Search
CPC ...... G06F 21/78; G06F 21/64; G06F 21/602; G06F 21/72; G06F 21/85; G06F 21/572; G06F 21/606; H04L 9/00; H04L 2209/80; H04L 2209/12; H04L 9/0869; H04L 63/067; H04L 63/0876; H04L 9/3234; H04L 63/30; H04L 63/061; H04L 21/53; H04L 21/606; H04L 21/78; H04L 21/64; H04L 21/602; H04L 21/72; H04L 21/85; H04L 21/572
See application file for complete search history.

(56) References Cited

U.S. PATENT DOCUMENTS

| | | | |
|---|---|---|---|
| 7,577,840 B2 | 8/2009 | England et al. | |
| 2005/0201564 A1* | 9/2005 | Kayashima et al. | 380/283 |
| 2006/0064759 A1* | 3/2006 | Agranat | 726/26 |
| 2007/0050780 A1* | 3/2007 | O'Dea et al. | 719/313 |
| 2007/0199046 A1* | 8/2007 | O'Brien | 726/2 |
| 2010/0197326 A1* | 8/2010 | Ngo | 455/466 |
| 2011/0060909 A1* | 3/2011 | Brown et al. | 713/170 |
| 2012/0079282 A1* | 3/2012 | Lowenstein et al. | 713/189 |
| 2013/0297937 A1* | 11/2013 | Fransen | 713/170 |
| 2014/0133656 A1* | 5/2014 | Wurster et al. | 380/270 |
| 2014/0250511 A1* | 9/2014 | Kendall | 726/6 |

* cited by examiner

*Primary Examiner* — Don Zhao

(74) *Attorney, Agent, or Firm* — The Farrell Law Firm, P.C.

(57) ABSTRACT

A method of operating data security and an electronic device supporting the same are provided. The method includes executing a general Application (App) based on a non-trusted execution module; executing a first trusted App related to the execution of the general App based on a trusted execution module; generating a message by encrypting data generated in the first trusted App; transmitting the encrypted message to the general App; and transmitting the encrypted message to a second trusted App related to the execution of the general App and executed based on the trusted execution module.

17 Claims, 5 Drawing Sheets

METHOD OF OPERATING DATA SECURITY AND ELECTRONIC DEVICE SUPPORTING THE SAME

PRIORITY

This application claims priority under 35 U.S.C. §119(a) to Korean Patent Application No. 10-2013-0093950, filed in the Korean Intellectual Property Office on Aug. 8, 2013, the entire content of which is incorporated herein by reference.

BACKGROUND OF THE INVENTION

1. Field of the Invention

The present invention generally relates to an electronic device operating data security.

2. Description of the Related Art

An electronic device may support an installation of an application supporting a particular function. For example, the electronic device may support a document writing related function. The electronic device may store data according to an operation by a user. For example, the electronic device may operate a finance related application. During an operation of the finance related application, data security is considered to be an important issue.

Recently, an electronic device is designed to include a Trusted Execution Environment (TEE) and a Non-Trusted Execution Environment (NTEE) in connection with data security. The trusted execution environment refers to an environment in which a Trusted Application (TA) is executed. The trusted App limits Apps of a non-trusted execution environment in accessing or using a path influenced from data used in the trusted App or an execution of the trusted App for processing in the non-trusted execution environment.

Meanwhile, when a function is executed in the non-trusted execution environment, positions of a plurality of trusted Apps and the data use within the trusted execution environment may be required. In such an environment, the trusted Apps may be required to exchange data. However, the trusted execution environment of currently provided electronic devices does not allow a direct data exchange between the trusted Apps. Accordingly, a data routing is designed in such a manner that, after a particular trusted App exchanges data with a general App executed in the non-trusted execution environment, the general App transmits the data to another trusted App in the trusted execution environment.

Since data used in the trusted App is transmitted to another trusted App through the general App, a particular device or a user which can access the general App may perform sniffing on or copy data used in the trusted Apps, or transmit the data to an unintended other trusted App, which may cause problems for security.

SUMMARY OF THE INVENTION

The present invention has been made to solve at least the above-mentioned problems and/or disadvantages and to provide at least the advantages described below. Accordingly, an aspect of the present invention is to provide a technology which can stably exchange data between trusted Apps.

In accordance with an aspect of the present invention, a method of operating data security is provided. The method includes executing a general Application (App) based on a non-trusted execution module; executing a first trusted App related to the execution of the general App based on a trusted execution module; generating a message by encrypting data generated in the first trusted App; transmitting the encrypted message to the general App; and transmitting the encrypted message to a second trusted App related to the execution of the general App and executed based on the trusted execution module.

In accordance with another aspect of the present invention, an electronic device supporting a data security operation is provided. The electronic device includes a non-trusted execution module configured to support an execution of a general App; and a trusted execution module configured to support executions of a first trusted App and a second trusted App related to the execution of the general App, to generate an encrypted message by encrypting data generated in the first trusted App, and to transmit the encrypted message to the second trusted App through the general App.

BRIEF DESCRIPTION OF THE DRAWINGS

The above and other aspects, features and advantages of the present invention will be more apparent from the following detailed description, taken in conjunction with the accompanying drawings, in which.

DETAILED DESCRIPTION OF EMBODIMENTS OF THE PRESENT INVENTION

Hereinafter, embodiments of the present invention will be described in detail with reference to the accompanying drawings. In describing embodiments of the present invention, a description will be omitted of the technical contents that are well known in the technical field, to which the present invention pertains, and are not directly related to the present invention. Also, the descriptions of the component elements that have substantially identical configurations and functions will be omitted.

For the same reason, in the accompanying drawings, some elements may be exaggerated, omitted, or schematically illustrated, and a size of each element may not precisely reflect the actual size thereof. Thus, the present invention is not limited by the relative size or interval drawn in the accompanying drawings.

An electronic device according to an embodiment of the present invention is a device including a communication function. For example, the electronic device may be one or a combination of a smart phone, a tablet Personal Computer (PC), a mobile phone, a video phone, an e-book reader, a desktop PC, a laptop PC, a netbook computer, a Personal Digital Assistant (PDA), a Portable Multimedia Player (PMP), a camera, a wearable device, a smart white appliance (for example, refrigerator, air conditioner, cleaner, artificial intelligence robot, TV, Digital Video Disk (DVD) player, audio player, oven, microwave oven, washing machine, air cleaner and electronic frame), various types of medical devices (for example, Magnetic Resonance Angiography (MRA), Magnetic Resonance Imaging (MRI), Computed Tomography (CT), scanner, an ultrasonic device, and the like), a navigation device, a Global Positioning System (GPS) receiver, an Event Data Recorder (EDR), a Flight data Recorder (FDR), a set-top box, TV box (for example, Samsung HomeSync™, Apple TV™, or Google TV™), an electronic dictionary, a vehicle infotainment device, electronic equipment for ship (for example, a navigation device for ship, a gyro compass and the like), avionics, a security device, electronic clothes, a camcorder, game consoles, Head-Mounted Display (HMD), a flat panel display device, an electronic frame, an electronic album, furniture or a part of buildings/structures having a communication function, an electronic board, an electronic signature receiving device, and a projector. It is obvious to those skilled in the art that the electronic device according to the present invention is not limited to the aforementioned devices.

According to various embodiments of the present invention, stable data transmission between trusted Apps can be performed based on data encryption transmission.

According to various embodiments of the present invention, data exchanged between trusted Apps is reliable based on an encrypted data operation.

Figure 1:
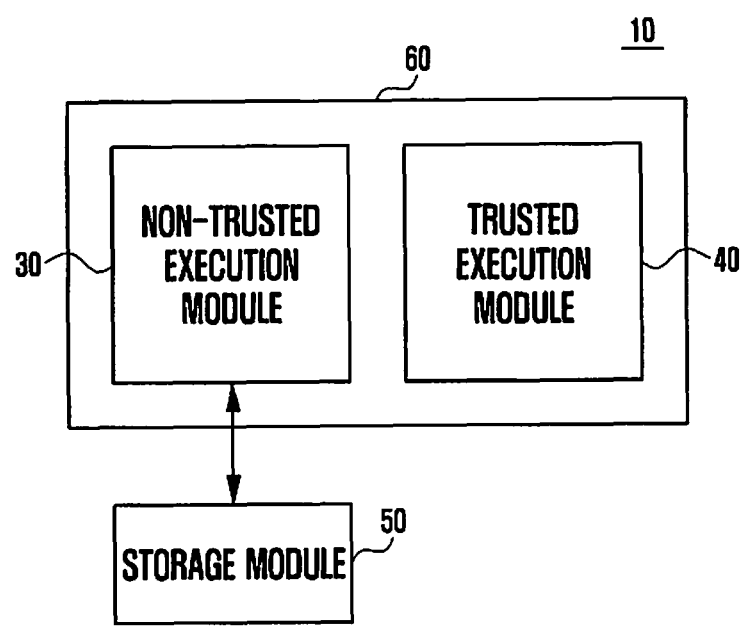
FIG. 1 is a block diagram illustrating a configuration of an electronic device according to an embodiment of the present invention.

FIG. 1 is a block diagram illustrating a configuration of an electronic device according to an embodiment of the present invention.

Referring to FIG. 1, an electronic device 10 according to an embodiment of the present invention includes a control module 60 and a storage module 50.

The control module 60 includes a non-trusted execution module 30 and a trusted execution module 40. The storage module 50 which can access the control module 60 may be included in the control module 60, or may be connected to the control module 60.

The electronic device 10 executes various Applications (Apps) in accordance with a control of the control module 60. For example, the electronic device 10 supports executions of various Apps, such as a file reproduction App, a broadcast reception App, and a camera App. According to an embodiment, the electronic device 10 supports an execution of a non-trusted App or a general App which does not require a separate security. Further, the electronic device 10 supports an execution of a trusted App which requires the security. The electronic device 10 supports executions of a plurality of trusted Apps which require the security.

A system operation in the electronic device 10 is supported such that two execution environments can coexist. A first execution environment is a non-trusted execution environment. The non-trusted execution environment may be implemented by a general operating system execution environment. For example, the non-trusted execution environment is implemented by an operating system, such as Linux, Android, and the like. A second execution environment is a trusted execution environment. The trusted execution environment may be implemented by a particular hardware arrangement. For example, TrustZone execution environment is implemented by a barrier such as A8, A9, A15 or TurstZone of ARM corp. In such an environment, the non-trusted execution environment cannot access resources, codes, or hardware of the trusted execution environment.

The non-trusted execution environment may include all hardware required for implementing a commercial operating system, such as Linux, Android, and the like. For example, the non-trusted execution environment includes a memory, a storage, timers, and other common hardware modules. Further, the non-trusted execution environment may include user interface processing modules for inputting or outputting user data of the electronic device 10. A user input device may include a mouse, a touch screen, a keyboard, and various types of switches or buttons. A preference input device may be a touch screen and a keyboard.

In the following description, a control module supporting the non-trusted execution environment will be referred to as a non-trusted execution module, and a control module supporting the trusted execution environment will be referred to as a trusted execution module.

The non-trusted execution module 30 executes one or more general Apps in a non-trusted execution environment. The non-trusted execution module 30 accesses the storage module 50. The non-trusted execution module 30 loads and executes App routines or instructions corresponding to one or more general Apps stored in the storage module 50. The non-trusted execution module 30 may need to process an execution routine which is required to be secured in a general App executing process. When processing of a trusted execution routine is required, the non-trusted execution module 30 makes a request for the processing to the trusted execution module 40. For example, a general App 33 being executed in the non-trusted execution module 30 makes a request for security processing to the trusted execution module 40 if necessary. The non-trusted execution module 30 receives a result of the security processing by the trusted execution module 40 and then processes data on an execution of an additional general App.

According to an embodiment of the present invention, a web browser is a general App and may be executed through the non-trusted execution module 30. The web browser accesses a server device corresponding to predefined address information or particular address information. The server device accepts an access of the electronic device based on the web browser. Further, when routine processing related to financial issues is required, the server device makes a request for security processing to the electronic device 10. The web browser corresponding to a general App makes a request for security processing related to the financial issues to the trusted execution module 40.

The trusted execution module 40 may be activated with an activation operation of the non-trusted execution module 30. Alternatively, the trusted execution module 40 may be activated by a request of the non-trusted execution module 30. When security processing is requested during an execution of the general App in an operation of the non-trusted execution module 30, the trusted execution module 40 supports the corresponding security processing. Alternatively, the trusted execution module 40 may be activated in response to a request for the security processing of the non-trusted execution module 30 and perform the security processing corresponding to the request.

According to an embodiment of the present invention, the trusted execution module 40 executes a plurality of trusted Apps. The trusted execution module 40 transmits data between a plurality of trusted Apps through a general App executed in the non-trusted execution module 30. In such an operation, the trusted execution module 40 performs an encryption to secure the reliability of the received data.

The non-trusted execution module 30 and the trusted execution module 40 will be described in more detail with reference to FIG. 2.

Figure 2:
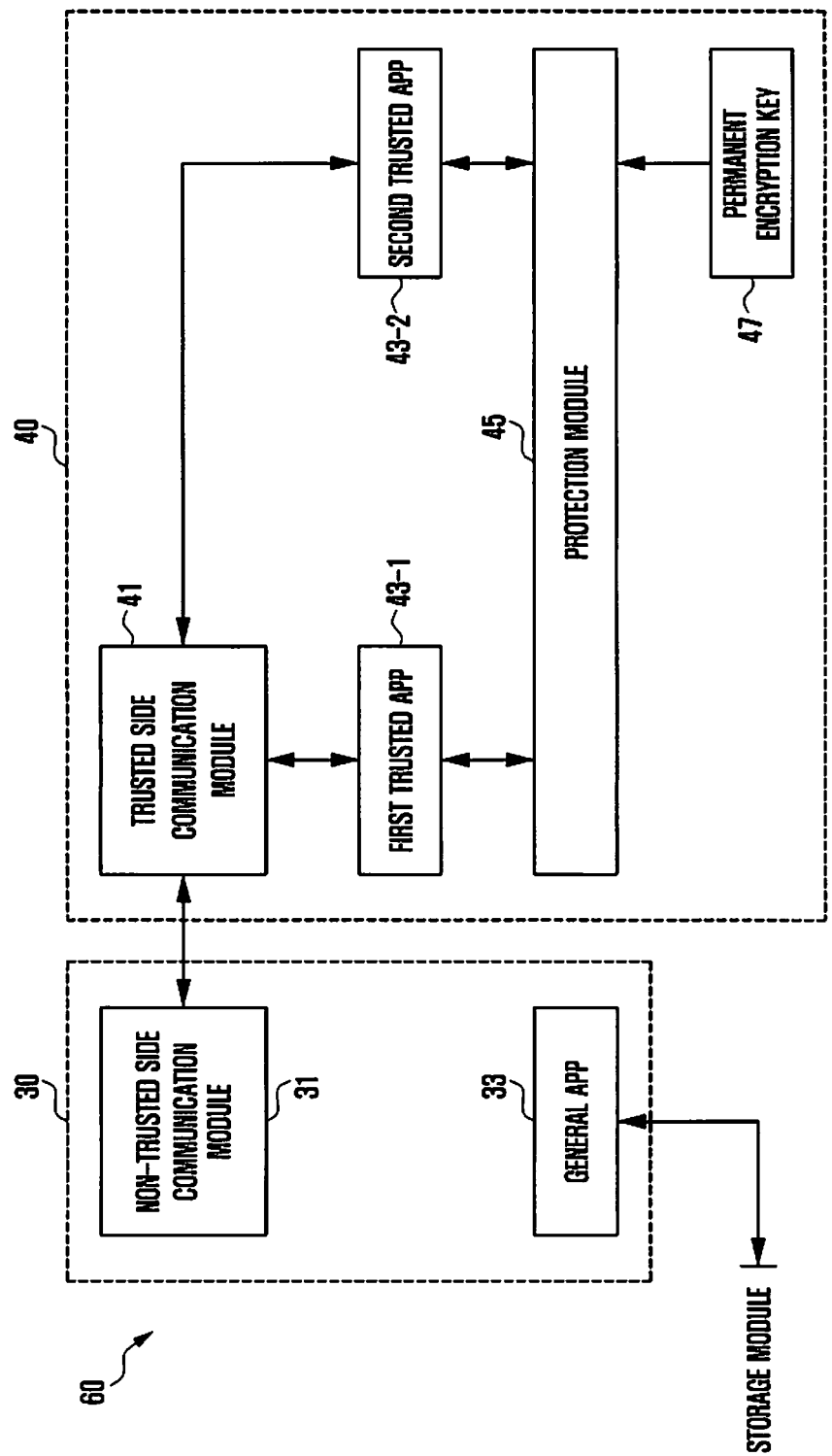
FIG. 2 is a block diagram illustrating in detail execution modules of a control module according to an embodiment of the present invention.

FIG. 2 is a block diagram illustrating execution modules of the control module according to an embodiment of the present invention. Execution modules of the control module 60 described in FIG. 2 may be configured by a combination of one or more of a hardware processor, a firmware process, a middleware processor, and a software processor.

Referring to FIG. 2, the non-trusted execution module 30 of the control module 60 includes a non-trusted side communication module 31 and the general App 33.

The non-trusted execution module 30 includes the non-trusted side communication module 31 which can transmit data to the trusted execution module 40. The non-trusted side communication module 31 transmits data to a particular component of the trusted execution module 40 from the non-trusted execution module 30. The non-trusted side communication module 31 may be implemented as a communication module for ARM TrustZone based hardware. Here, TrustZone is a security hardware and software technology developed by ARM corp. for offering a secure execution environment. The non-trusted side communication module 31 may be implemented by an operating system kernel having drivers for data communication from the non-trusted execution module 30 to the trusted execution module 40.

The general App 33 makes a request for transmitting data of a trusted App 43_1, for example, data of a source trusted App, to a trusted App 43_2, such as a destination trusted App. The general App 33 sets up a connection with the trusted App 43_1 by using the non-trusted side communication module 31 and a trusted side communication module 41.

The general App 33 forms a connection with the trusted App 43_2 by using the non-trusted side communication module 31 and the trusted side communication module 41. Further, the general App 33 transmits a message (received from the trusted App 43_1 or previously stored in a storage module 50) to the trusted App 43_2. The general App 33 receives a message from the trusted App 43_2 or transmits a message to the trusted App 43_2. The general App 33 stores a message in the storage module 50 in a volatile memory type or a non-volatile memory type.

The trusted execution module 40 of the control module 60 includes the non-trusted side communication module 41, at least one of trusted Apps 43_1 and 43_2, a protection module 45, and a permanent encryption key 47.

The trusted execution module 40 includes the trusted side communication module 41 for transmitting/receiving data to/from the non-trusted execution module 30. The trusted side communication module 41 may be implemented based on a micro kernel within the trusted execution module 40 or another operating system. The trusted side communication module 41 receives data from the non-trusted side communication module 31 and transmits data to the one or more trusted Apps 43_1 and 43_2.

The trusted Apps 43_1 and 43_2 is trusted Apps executed in the trusted execution module 40. The trusted Apps 43_1 and 43_2 perform security processing in response to a request for the general App 33 executed in the non-trusted execution module 30. Further, when a data exchange between the trusted Apps 43_1 and 43_2 is required in the security processing operation, the trusted Apps 43_1 and 43_2 perform the data exchange through the general App 33. According to an embodiment of the present invention, a task requiring particular security processing in an operation of the general App 33 may be requested. The general App 33 then make a request for the security processing to the trusted App 43_1 through the non-trusted side communication module 31 and the trusted side communication module 41. The trusted App 43_1 performs the security processing and outputs a result of the performance. In such an operation, the result of the performance of the trusted App 43_1 is needed to be transmitted to another App, for example, the trusted App 43_2. The trusted App 43_1 then encrypts the result of the performance and transmits the encrypted result to the trusted App 43_2 via the general App 33. The trusted Apps 43_1 and 43_2 have unique IDs (Trusted Application IDs (TAIDs)).

According to an embodiment of the present invention, the trusted App 43_1 is an App performing the security processing by a request of the general App 33. The trusted App 43_1 may also be a source App transmitting a result of the security processing to the trusted App 43_2.

The trusted App 43_1 performs the following operation in order to transmit the result of the security processing to the trusted App 43_2. The trusted App 43_1 obtains a unique ID of the trusted App 43_2, for example, a TAID of the trusted App 43_2. According to another embodiment of the present invention, the general App 33 executed in the non-trusted execution module 30 informs the trusted App 43_1 of the TAID of the trusted App 43_2. In connection with support of the operation, the general App 33 sets up a communication connection with the trusted App 43_2. The general App 33 makes a request for the TAID to the trusted App 43_2, receives the TAID, and transmits the TAID to the trusted App 43_1. Alternatively, the protection module 45 may collect TAIDs of trusted Apps executed in connection with the general App 33 and the collected TAIDs may be shared.

The trusted App 43_1 makes a request for encrypting data to the protection module 45 to transmit the data to the trusted App 43_2 while providing particular information including the TAID of the trusted App 43_2 and key selector data (e.g., a key selection indicator for protecting data, a temporary encryption key, a permanent encryption key, or a one time key for data) to the protection module 45.

When the trusted App 43_1 receives encrypted data from the protection module 45, the trusted App 43_1 generates a message to be transmitted to the trusted App 43_2 through the non-trusted execution module 30. The message may include the TAID of the trusted App 43_2, key selector data, random nonce and encrypted data. The trusted App 43_1 transmits the message to the general App 33 of the non-trusted execution module 30 through the trusted side communication module 41 and the non-trusted side communication module 31.

The trusted App 43_2 calls the protection module 45 to decrypt the data stored in the message. The message is a message transmitted by the general App 33 and generated by the trusted App 43_1. The trusted App 43_2 consumes data. Further, the trusted App 43_2 inspects whether the TAID of the trusted App 43_1 can be acceptable and determines use or disuse of the data.

The protection module 45 is used by the trusted Apps 43_1 and 43_2 to protect the message. The protection module 45 randomly generates a temporary encryption key in response to a start of an execution of the trusted execution module 40 and re-makes previous information of a key storage 45_3. The protection module accesses a permanent encryption key encrypted and then stored in the trusted execution module 40.

A permanent encryption key (permanent key) 47 may have a unique value in a device in which the trusted execution module 40 is executed. Accordingly, another trusted execution module device may have another permanent key. The permanent encryption key 47 is accessed by the protection module 45. The trusted Apps 43_1 and 43_2 cannot access the permanent encryption key 47. The components of the non-trusted execution modules 30 cannot also access the permanent encryption key.

Figure 3:
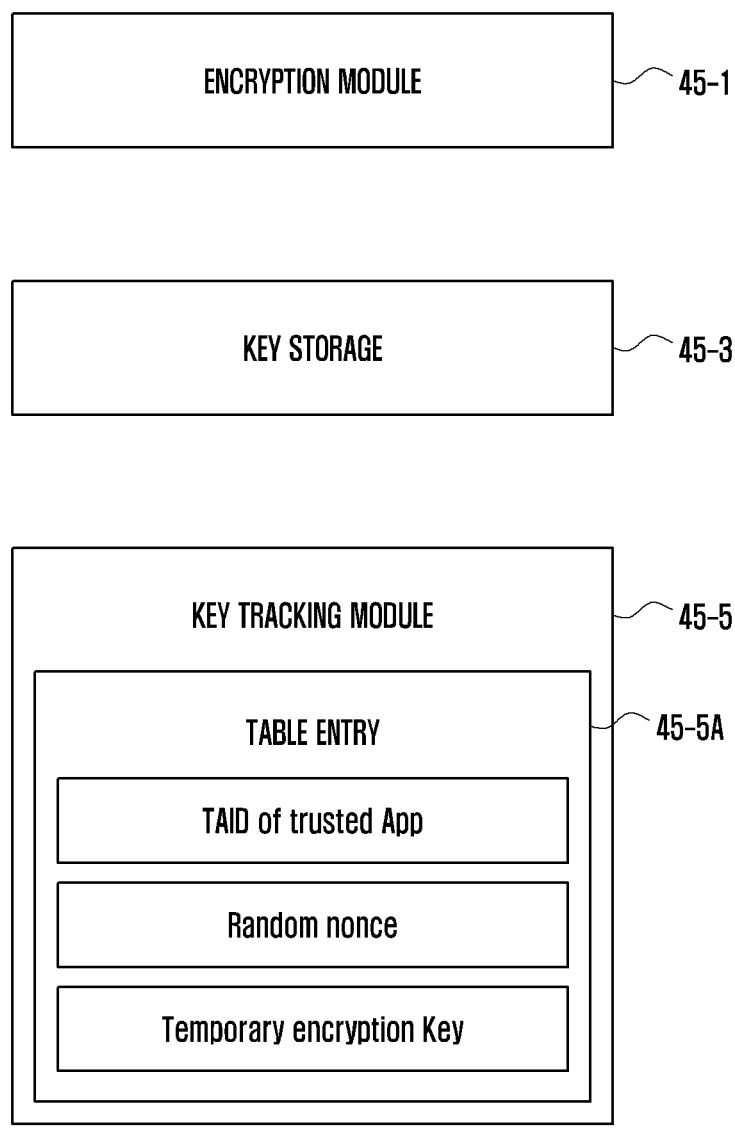
FIG. 3 illustrates a configuration of a protection module according to an embodiment of the present invention.

FIG. 3 illustrates a configuration of the protection module 45 according to an embodiment of the present invention.

Referring to FIG. 3, the protection module 45 includes an encryption module 45_1, a key storage 45_3, and a key tracking module 455.

The encryption module 45_1 is used by the protection module 45 to encrypt data or decrypt the encrypted data by using an encryption algorithm. The encryption algorithm executed by the encryption module 45_1 may be an Advanced Encryption Standard (AES) algorithm. According to an embodiment, the encryption algorithm may be prepared to be used in a particular operation mode such as an AES, Google Cloud Messaging (GCM) mode.

The key storage 45_3 is a component for storing the temporary encryption key. The temporary encryption key is used for encrypting or decrypting data by a particular trusted App. The temporary encryption key is generated at every boot time of the trusted execution module 40. According to an embodiment, when a next boot operation of the trusted execution module 40 is performed, a previous temporary encryption key is replaced with a new key. The temporary encryption key may be generated using a source having high entropy such as a random number generator.

The key tracking module 45_5 includes a table entry 45_5A having columns including a TAID of the trusted App, a random nonce, and a temporary encryption key. When the temporary encryption key is generated, the table entry 45_5A is updated.

The protection module 45 having the above described configuration performs a predetermined operation when receiving an encryption request from the trusted App 43_1. According to an embodiment, the protection module 45 obtains a unique ID, for example, a TAID, of the trusted App 43_1 and a unique ID, for example, a TAID, of the trusted App 43_2. When the TAID of the trusted App 43_2 does not exist in the trusted execution module 40, the protection module 45 rejects a request for protecting the data of the trusted App 43_1. The protection module 45 generates a table entry 45_5A within the key tracking module 45_5 by adding predetermined information to the entry. The predetermined information includes a TAID of the trusted App 43_2, an ID of the trusted App 43_1, a random nonce, and an encryption key based on key selector data.

When the temporary encryption key is selected by the trusted App 43_1, the temporary encryption key is set as a key for encrypting the data of the protection module 45. When the permanent encryption key 47 is selected by the trusted App 43_1, the protection module 45 sets the key for encrypting the data as a permanent encryption key. When a one time key is selected by the trusted App 43_1, the protection module 45 generates a random key and sets the generated random key as an encryption key. The selection of at least one of the temporary encryption key, the permanent encryption key 47, and the random key may be determined according to a scheme defined in the trusted App 43_1. Alternatively, a particular key may be selected according to a level of the performed security processing. For example, when a security processing level is higher than or equal to a predetermined level, the permanent encryption key 47 is set as the encryption key. When a security processing level is equal to or lower than a predetermined level, the random key is set as the encryption key. When the encryption key is set, the protection module 45 encrypts the data using the TAID of the trusted App 43_2, the TAID of the trusted App 43_1, the random nonce, and the encryption key. When the data encryption is completed, the protection module 45 returns the random nonce and the encryption key to the trusted App 43_1.

The trusted App 43_2 transmits a message received from the general App 33 to the protection module 45 to make a request for decrypting the data. The protection module 45 performs an operation related to the decryption when receiving the request for decrypting the data from the trusted App 43_2. For example, the protection module 45 obtains the TAID of the trusted App 43_2. When the TAID is obtained, the protection module 45 performs a predetermined operation based on key selector data. According to an embodiment, when the message provided by the trusted App 43_2 includes the one time key, the protection module 45 searches a table entry 45_5A within the key tracking module 45_5 for entries matching the TAID of the trusted App 43_2 and the random nonce included in the message. When there is no table entry 45_5A, the protection module 45 returns No Data and an error to the trusted App 43_2. When there are table entries, the protection module 45 selects an individual temporary encryption key from the table entry 45_5A and uses the encryption module 45_1 for decrypting the message.

According to another embodiment of the present invention, when the permanent encryption key 47 is included in the message provided by the trusted App 43_2, the protection module 45 selects the permanent encryption key 47 and uses the encryption module 45_1 for decrypting the message. According to yet another embodiment of the present invention, when the temporary encryption key is included in the message, the protection module 45 selects the temporary encryption key from the key storage 45_3 and uses the encryption module 45_1 for decrypting the message.

When the decryption of the message is completed, the protection module 45 compares the TAID of the trusted App 43_2 and the TAID of the trusted App having made the request for decrypting the message. When unique IDs do not match each other, the protection module 45 returns No Data and informs the trusted App 43_2 of an error.

In using the one time key and the temporary encryption key, the protection module 45 additionally identifies whether the random nonce extracted from the message matches the decrypted random nonce. When the random nonces do not match, the protection module 45 returns No Data and transmits information of an error to the trusted App 43_2. In using the one time key, the protection module 45 removes a just used encryption key and an individual entry from the key tracking module 45_5. The protection module 45 returns the decrypted data and transmits the TAID of the trusted App 43_1 to the trusted App 43_2.

Figure 4:
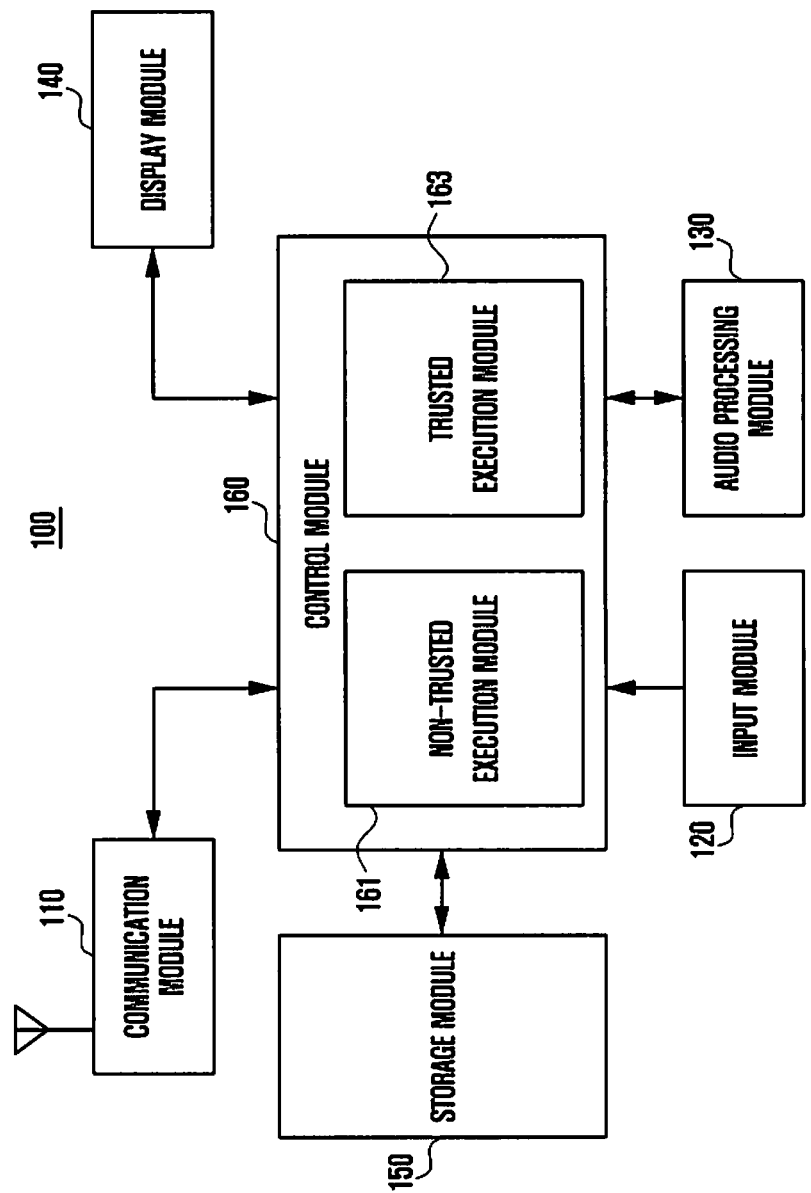
FIG. 4 is a block diagram illustrating a configuration of an electronic device to which a control module according to an embodiment of the present invention is applied.

FIG. 4 is a block diagram illustrating a configuration of an electronic device in another form to which the control module according to an embodiment of the present invention is applied.

Referring to FIG. 4, an electronic device 100 includes a communication unit 110, an input module 120, an audio processing module 130, a display module 140, a storage module 150, and a control module 160.

The electronic device 100 having such a configuration includes the components of the electronic device 10 illustrated in FIGS. 1-3 or employ components changed from the components of the electronic device 10. According to an embodiment, the control module 60 of the electronic device 10 illustrated in FIGS. 1-3 is the same component as the control module 160 of the electronic device 100 and have an additional supporting function to support a particular user function of the electronic device 100.

The communication unit 110 is a component supporting a communication function of the electronic device 100. The communication unit 110 forms a communication channel with another electronic device or a communication channel for a connection with a server device. For example, the communication unit 110 forms a communication channel with a server device providing a service related to finance, stocks, product purchase, product sale, and the like. At this time, the communication unit 110 forms the communication channel with the server device through a base station. The communication unit 110 is a communication module supporting a mobile communication function or a communication module which can access a wireless or wired Access Point (AP). The communication unit 110 forms an Internet based communication channel.

The communication unit 110 forms a non-trusted communication channel or a trusted communication channel according to a characteristic of another device connected to the electronic device 100. The trusted communication channel is a communication channel through which trusted data is transmitted and received. For example, the communication unit 110 forms the trusted communication channel when the above described trusted Apps are executed. The trusted communication channel may be the physically same channel as the non-trusted communication channel, but the trusted communication channel may also be implemented in a form in which only trusted data is transmitted and received.

The communication unit 110 supports the formation of the communication channel for executing the general App. The communication unit 110 supports transmission/reception of data required for executing the general App based on the formed communication channel. Further, the communication unit 110 supports transmission/reception of data required for executing the trusted App with another electronic device or a server device.

The input module 120 supports generation of an input signal of the electronic device 100. The input module 120 includes at least one form which can generate an input event in the electronic device 100. For example, the input module 120 includes a key button in the form of a hardware physical key. The key button may include various keys, such as a side key, a home key, a power key, and the like. The input module 120 may include a touch panel, a touch sheet, and the like. The input module 120 may include the display module 140 having a touch function. The input module 120 may include the audio processing module 130 when an audio voice recognition function is supported. When sensor signals of various sensors are processed as input signals, the input module 120 includes one or more sensors. The one or more sensors may be various sensors, such as an acceleration sensor, an illumination sensor, a proximity sensor, a gyro sensor and a humidity sensor. The input module 120 generates an input signal making a request for activating the general App, an input signal making a request for activating the trusted App in a general App executing operation, and an input signal making a request for terminating the general App and the trusted App according to a user's control.

The audio processing module 130 supports output and collection of an audio signal related to the operation of the electronic device 100. The audio processing module 130 may include a speaker and a microphone. The audio processing module 130 supports processing of an audio signal generated in the general App executing operation. When a call of the trusted App is required in the general App execution operation, the audio processing module 130 supports output of an informing sound or an effect sound thereof if necessary. Further, when data transmission between the trusted Apps is required, the audio processing module 130 supports output of an informing sound or an effect sound thereof if necessary.

The display module 140 outputs various screens related to the operation of the electronic device 100. For example, the display module 140 outputs a standby screen, a menu screen, and a particular function performance screen. For example, the display module 140 outputs screens corresponding to a file reproduction function, a broadcast reception function, and a file search function. The display module 140 outputs a screen related to an execution of the general App when the general App is executed. For example, when the general App is a web server device access App, the display module 140 receives a server page provided by the server device and outputs the server page. The display module 140 outputs a screen related to an execution of the trusted App. For example, the display module 140 outputs a screen such that at least a part of an image, a text, and the like, related to the trusted App are overlaid with a general App execution screen. Alternatively, the display module 140 outputs a screen related to a security operation through an entire screen.

When the display module 140 has an input function, a trusted execution module 163 has a right to control the display module 140 during the execution of the trusted App. When the trusted App is terminated, a non-trusted execution module 161 has the right to control the display module 140. The display module 140 outputs at least one of an image, a text, and the like, when a first trusted App transmits data to a second trusted App. When the trusted App is called and executed in the general App executing operation, a result of the execution of the trusted App is output on the display module 140 together with a general App execution related screen. The display module 140 displays the trusted App execution result and the general App execution screen such that the trusted App execution result and the general App execution screen are distinguished from each other.

The storage module 150 stores various application programs and data related to the operation of the electronic device 100. The storage module 150 may be the same as the storage module 50 illustrated in FIG. 1, or transformed from the storage module 50. The storage module 150 includes, for example, one or more general Apps. The general Apps are Apps processed without an execution of the trusted execution module 163. The general Apps makes a request for executing the trusted App in an execution process.

The control module 160 controls a processing and a transmission of a signal related to the operation of the electronic device 100. The control module 160 includes a non-trusted execution module 161 and a trusted execution module 163. The non-trusted execution module 161 is the same as the non-trusted execution module 30 illustrated in FIGS. 1-2, or transformed from the non-trusted execution module 30. The non-trusted execution module 161 supports an execution of the general App. The non-trusted execution module 161 communicates with the trusted execution module 163 to call the trusted App in the general App executing operation. The non-trusted execution module 161 outputs a screen related to the execution of the general App. When a result of the execution of the trusted App is irrelevant to the security processing, the non-trusted execution module 161 receives the corresponding result from the trusted App and controls to output the result on an execution screen of the general App.

The non-trusted execution module 161 controls the execution of the general App to support data transmission between the trusted Apps. For example, the non-trusted execution module 161 transmits a message received from a first trusted App to a second trusted App. The non-trusted execution module 161 collects information on a unique ID of the second trusted App in advance, or makes a request for information on a unique ID of the second trusted App. Further, the non-trusted execution module 161 transmits a message of the second trusted App to the first trusted App. In addition, when an App execution result of the second trusted App does not require a security processing, the non-trusted execution module 161 receives the corresponding result from the second trusted App and controls to output the received result on the display module 140.

The trusted execution module 163 is the same as the trusted execution module 40 illustrated in FIGS. 1-2, or transformed from the trusted execution module 40. The trusted execution module 163 may be booted in an operation in which the non-trusted execution module 161 is booted in a booting process of the electronic device 100. Alternatively, the trusted execution module 163 may be booted by a request of the non-trusted execution module 161 when the security processing is required. The trusted execution module 163 generates the temporary encryption key in the booting process as described above. Further, the trusted execution module 163 stores the permanent encryption key to be used for encryption or decryption. When the trusted execution module 163 is disposed within the control module 160, the trusted execution module 163 is implemented independently from the non-trusted execution module 161.

The trusted execution module 163 supports executions of one or more trusted Apps. For example, the trusted execution module 163 supports an execution of a particular trusted App which is requested according to an execution of the general App in the non-trusted execution module 161. In such an operation, the trusted execution module 163 executes a plurality of trusted Apps for supporting a security processing function of the general App. According to an embodiment, the trusted execution module 163 simultaneously activates and executes a password input processing trusted App, a trusted App for the security processing of an input particular code, and a trusted App for controlling a trusted communication channel with the server device. During such an operation, when sequential security processing is successfully performed, the trusted Apps are designed to execute a next trusted App. As a result, data transmission is required between trusted Apps. For the data transmission between the trusted Apps, the trusted execution module 163 transmits encrypted data to the general App, and the general App transmits the encrypted data to the trusted App which is required to receive the corresponding data.

As described above, the electronic device 100 encrypts and transmits data in a process of transmitting the data between the trusted Apps, so as to guarantee the reliability of the data.

Figure 5:
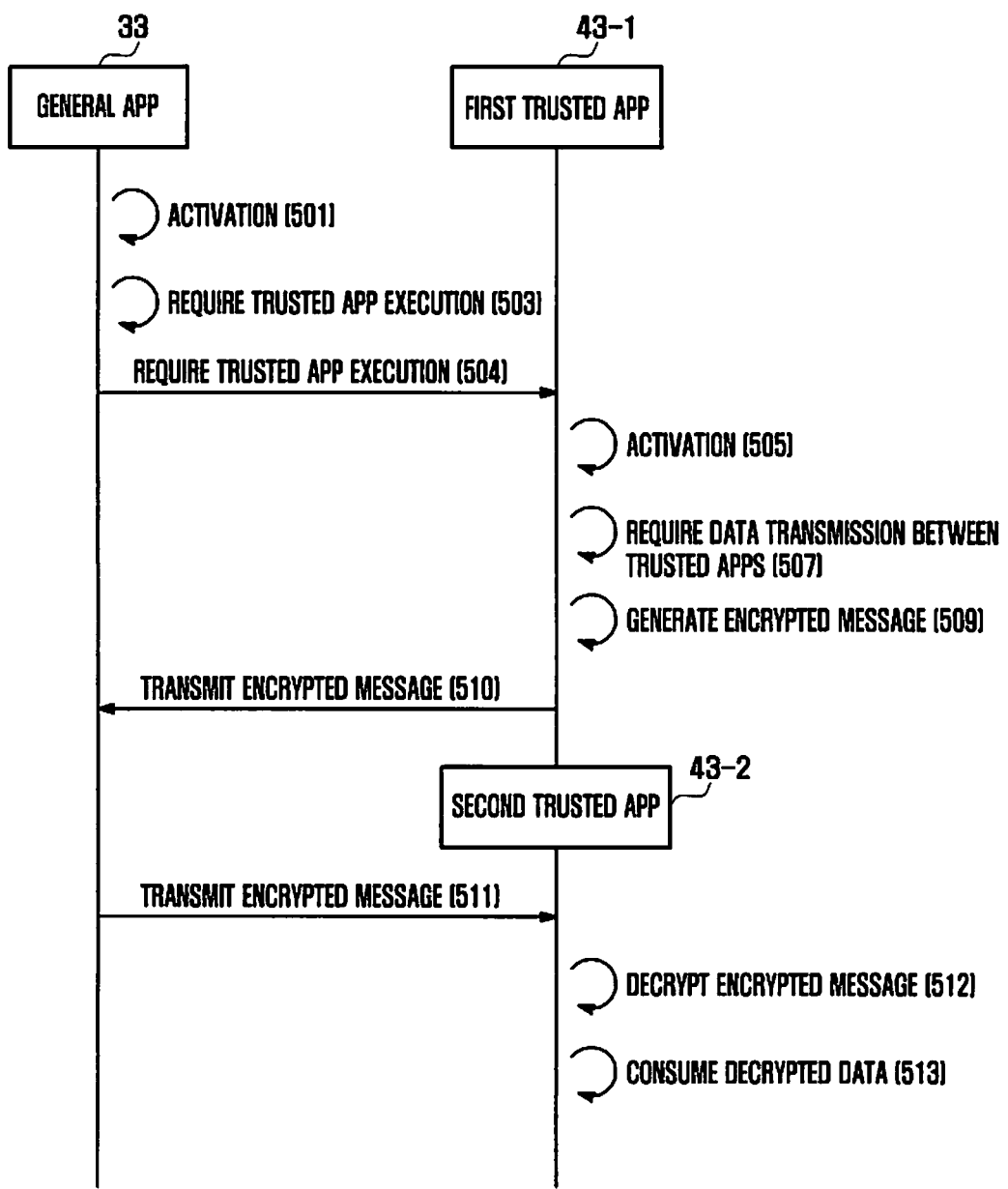
FIG. 5 illustrates a data security operating method according to an embodiment of the present invention.

FIG. 5 illustrates an electronic device operating method for a data security operation according to an embodiment of the present invention. FIG5 is described with reference to FIG. 4.

Referring to FIG. 5, in step 501, the control module 160 of the electronic device 100 activates the general App 33 according to an input event. For example, the control module 160 forms a communication channel for a connection of a web server device in connection with an execution of the general App 33. Further, the control module 160 receives a particular server page provided by the web server device, and controls to output the received server page on the display module 140.

In step 503, the general App 33 requires an execution of the trusted App during the execution of the general App 33. In such an operation, the general App 33 supports an App execution in the non-trusted execution module 161 when the execution of the trusted App is not required. For example, the general App 33 controls the App execution in accordance with an input signal generated in the input module 120, the control of the non-trusted execution module 161, and the support of the web server device.

When the execution of the trusted App is required in step 503, a request for the execution of the trusted App is made to the trusted execution module 163 in step 504. When the trusted execution module 163 receives the request for the execution of the trusted App from the general App 33, the trusted execution module 163 controls to activate the first trusted App 43_1 in step 505. For example, the general App 33 calls the trusted App in a particular function performing operation. The request for calling the trusted app is transmitted to the trusted side communication module 41 through the non-trusted side communication module 31. The trusted execution module 163 then identifies the execution of the trusted App requested by the general App 33 and controls to activate the first trusted App 43_1. When an activation of a plurality of trusted Apps is required, the trusted execution module 163 activates the plurality of trusted Apps.

During the execution of the first trusted App 43_1, data transmission to another trusted App, for example, the second trusted App 43_2 is requested in step 507. When data transmission between trusted Apps is required in step 507, the first trusted App 43_1 generates an encrypted message including data generated during the App execution in step 509. The first trusted App 43_1 transmits the generated data to the protection module 45 (see FIG. 2), and the protection module 45 generates an encrypted message by using the received data and other pieces of information. The encrypted message is transmitted to the first trusted App 43_1 or the general App 33 by the protection module 45.

The encrypted message generated by the first trusted App 43_1 includes a unique ID of a source trusted App, a unique ID of a destination trusted App to receive data, and encrypted data. The encrypted message may further include a random nonce. In step 507, when the data transmission between the trusted Apps is not required, the first trusted App 43_1 performs only the requested security processing. Further, the app execution may end according to schedule information.

When the encrypted message is generated in step 507, the first trusted App 43_1 transmits the encrypted message to the general App 33 in step 510. The general App 33 having received the encrypted message from the first trusted App 43_1 transmits the encrypted message to the second trusted App 43_2 in step 511.

When the second trusted App 43_2 receives the encrypted message from the general App 33, the second trusted App 43_2 decrypts the encrypted message in step 512. At this time, the second trusted App 43_2 makes a request for the decryption to the protection module. The protection module 45 performs the above described various processing in accordance with types of encryption keys. When the decryption of the message is completed, the second trusted App 43_2 consumes the decrypted data in step 513. For example, the second trusted App 43_2 performs another security processing based on the decrypted data. Thereafter, the second trusted App 43_2 may make a request for an App execution to the general App 33.

As described above, the data security operating method and the electronic device supporting the same according to various embodiments of the present invention can guarantee the reliability of data in an operation of transmitting data between trusted Apps. Accordingly, various embodiments of the present invention provide more stable function performance in the electronic device.

Meanwhile, the above-described device may further include various additional modules according to a provided type thereof. That is, the device may further include components which have not been mentioned, such as an interface for transmitting/receiving data through a wired communication scheme or a wireless communication scheme, an Internet communication module communicating with an Internet network to perform an Internet function, and a digital broadcasting module performing a digital broadcast receiving and reproducing function. Although all such elements may not be enumerated since modifications thereof can be diversely made according to a convergence trend of digital devices, elements equivalent to the aforementioned elements may be further included in the devices. Also, in the electronic device, a particular configuration may be excluded from the above-described configuration or may be replaced by another configuration according to embodiments of the present invention. This will be easily understood by those skilled in the art to which the present invention pertains.

Meanwhile, although embodiments of the present invention have been shown and described in this specification and the drawings, they are used in general sense in order to easily explain technical contents of the present invention, and to help comprehension of the present invention, and are not intended to limit the scope of the present invention. It is obvious to those skilled in the art to which the present invention belongs that other modifications can be established without departing from the technical spirit and scope of the present invention as defined by the appended claims and their equivalents.

What is claimed is:

1. A method of operating data security, the method comprising:
    executing a general Application (App) based on a non-trusted execution controller;
    executing a first trusted App related to the execution of the general App based on a trusted execution controller;
    generating an encrypted message by encrypting data generated in the first trusted App using an encryption algorithm;
    transmitting the encrypted message to the general App; and
    transmitting the encrypted message to a second trusted App related to the execution of the general App and executed based on the trusted execution controller,
    wherein the encrypted message includes the data, a unique IDentification (ID) of the second trusted App, a unique ID of the first trusted App, and key selector data.

2. The method of claim 1, further comprising:
    decrypting the encrypted message transmitted to the second trusted App; and
    consuming data included in the decrypted message in the second trusted App.

3. The method of claim 1, wherein generating the message comprises:
    collecting the unique ID of the second trusted App by the first trusted App; and
    collecting the key selector data.

4. The method of claim 3, wherein collecting the key selector data comprises selecting at least one of a permanent encryption key, a temporary encryption key, and a one time key.

5. The method of claim 4, wherein collecting the key selector data comprises selecting the at least one of the permanent encryption key, the temporary encryption key, and the one time key according to a security processing level.

6. The method of claim 1, wherein encrypting the message further comprises encrypting the message by adding a random nonce to the message.

7. The method of claim 1, wherein generating the message comprises generating a table entry including the unique ID of the first trusted App, the unique ID of the second trusted App, an encryption key based on the key selector data, and a random nonce.

8. The method of claim 7, further comprising:
    when the encrypted message includes a one time key, identifying whether the unique ID of the second trusted App and the random nonce included in the message match the table entry;
    when the table entry does not exist, outputting an error; and
    when the table entry exists, decrypting the message by using an individual temporary encryption key collected from the table entry.

9. The method of claim 1, further comprising:
    collecting the unique ID of the second trusted App by the general App; and
    transmitting the unique ID of the second trusted App to the first trusted App by the general App.

10. An electronic device supporting a data security operation, the electronic device comprising:
    a non-trusted execution controller configured to support an execution of a general App; and
    a trusted execution controller configured to support executions of a first trusted App and a second trusted App related to the execution of the general App, to generate an encrypted message by encrypting data generated in the first trusted App using an encryption algorithm, and to transmit the encrypted message to the second trusted App through the general App, wherein the encrypted message includes the data, a unique IDentification (ID) of the second trusted App, a unique ID of the first trusted App, and key selector data.

11. The electronic device of claim 10, wherein the trusted execution controller is further configured to decrypt the encrypted message transmitted to the second trusted App, and to consume data included in the decrypted message in the second trusted App.

12. The electronic device of claim 10, wherein the trusted execution controller is further configured to encrypt the message by adding a random nonce to the message.

13. The electronic device of claim 10, wherein the key selector data is at least one of a permanent encryption key, a temporary encryption key, and a one time key.

14. The electronic device of claim 13, wherein the trusted execution controller is further configured to select at least one of the permanent encryption key, the temporary encryption key, and the one time key according to a security processing level.

15. The electronic device of claim 10, wherein the trusted execution controller is further configured to generate a table entry including the unique ID of the first trusted App, the unique ID of the second trusted App, an encryption key based on the key selector data, and a random nonce.

16. The electronic device of claim 15, wherein the trusted execution controller is further configured to identify whether the unique ID of the second trusted App and the random nonce included in the message match the table entry when the encrypted message includes a one time key, to output an error when the table entry does not exist, and to decrypt the message by using an individual temporary encryption key collected from the table entry when the table entry exists.

17. The electronic device of claim 10, wherein the general App collects the unique ID of the second trusted App and transmits the unique ID of the second trusted App to the first trusted App.

\* \* \* \* \*